US006200471B1

United States Patent
Nohren, Jr.

(10) Patent No.: US 6,200,471 B1
(45) Date of Patent: Mar. 13, 2001

(54) BOTTLE SPECIALTY WATER FILTERS

(75) Inventor: John E. Nohren, Jr., Clearwater, FL (US)

(73) Assignee: Innova Pure Water, Inc., Clearwater, FL (US)

( * ) Notice: Subject to any disclaimer, the term of this patent is extended or adjusted under 35 U.S.C. 154(b) by 0 days.

(21) Appl. No.: 09/228,746

(22) Filed: Jan. 12, 1999

(51) Int. Cl.$^7$ .................................................. C02F 9/00
(52) U.S. Cl. ........................ 210/184; 210/266; 210/282
(58) Field of Search .................................... 210/184, 185, 210/186, 266, 282, 284, 291, 489

(56) References Cited

U.S. PATENT DOCUMENTS

| | | | |
|---|---|---|---|
| 5,431,813 | * | 7/1995 | Daniels .................................. 210/282 |
| 5,609,759 | | 3/1997 | Nohren, Jr. et al. .................. 210/266 |

* cited by examiner

*Primary Examiner*—Ivars Cintins
(74) *Attorney, Agent, or Firm*—Nixon & Vanderhye P.C.

(57) ABSTRACT

A filter assembly for use with a bottle having a substantially circular cross-section neck or open end includes a cap for closing the bottle neck or open end including an upper surface, and a manual valve associated with an outer substantially liquid impermeable housing may be operatively connected to the cap at an upper end of the housing and has a number of substantially radially extending openings adjacent the upper end portion to allow liquid to flow into a substantially annular open cavity within the housing. The cavity substantially radially surrounds an inner at least primarily radial flow filter element, such as a carbon/plastic matrix which removes chlorine from drinking water. A treating element is positioned so that water flowing through the openings and into the cavity is treated, either by removing contaminants from the water, or by chilling it. The treating element may comprise an axial flow liquid porous treating media such as granules of ion exchange resin, or may be a micro-porous filter element through which liquid flows radially into the open cavity, or may be a water chilling element that chills water in the open cavity.

15 Claims, 4 Drawing Sheets

BOTTLE SPECIALTY WATER FILTERS

BACKGROUND AND SUMMARY OF THE INVENTION

In U.S. Pat. No. 5,609,759, and in co-pending applications Ser. No. 09/008,845, filed Jan. 20, 1998 and Ser. No. 09/132,312, filed Aug. 11, 1998 (the disclosures of which are hereby incorporated by reference herein) a wide variety of different types of filter assemblies are described which have great portability, are inexpensive, and are capable of removing a significant amount of chlorine, and/or other undesirable contaminants from water, both to improve the taste and in some cases to improve the safety of the water for drinking purposes. The basic concepts disclosed in this patent and co-pending applications are becoming increasingly popular, and demonstrate that there are even a wide variety of other potential uses for the basic filtering assembly if appropriately simple yet effective constructions can be devised.

According to the present invention, various filter assembly constructions are provided which expand the versatility and functionality of the basic concepts of the filter assembly disclosed in the above-referenced patent and co-pending applications. The filter assembly constructions according to the present invention are capable of providing, according to one aspect thereof, a portable water treatment unit which has the capacity to remove at least 50% of each of lead, arsenic, bacteria, and/or viruses, or like contaminants, as well as chlorine, taste and odor. Though the construction according to this aspect of the invention is not much more complicated than the construction in U.S. Pat. No. 5,609,759, it has greatly enhanced functionality. These desired results may be achieved by providing an axial flow pathway for treatment of water before it flows into a substantially annular cavity surrounding a conventional primarily radially flow filter element (such as a porous activated carbon and plastic matrix having a porosity of between about 10–150), or a micro-porous filter element, which maybe in a pleated or accordion configuration, is provided through which liquid radially flows to the inner filter element. Alternatively, the treatment of the liquid may be provided by cooling the liquid, to improve its taste and the effect is has on the user, a water chilling element being provided defining the substantially annular open cavity and cooling the water and flowing into and within the cavity.

According to one aspect of the present invention a filter assembly is provided for use with a bottle having a substantially circular cross-section neck or open end. The filter assembly comprises the following components: A cap for closing the bottle neck or open end, including an upper surface. A manual valve, manually movable between open and closed positions, associated with the upper surface. An outer, substantially liquid impermeable, housing having upper and lower end portions, the upper end portion operatively connected to the cap. A plurality of openings in the outer housing disposed adjacent the upper end portion to allow liquid to flow therethrough. An inner at least primarily radial flow filter element having top and bottom ends, the top end operatively connected to the cap and positioned so that liquid from the bottle must flow therethrough before passing through the manual valve. A substantially annular open cavity substantially radially surrounding the inner filter element, and interior of the outer housing. And, a treating element which treats liquid passing through the outer housing openings and into the open cavity, the treating element operatively between the outer housing and the open cavity. The valve may alternatively be operated semi-automatically or automatically.

In one construction according to this aspect, the filter assembly further comprises an inner substantially liquid impermeable housing disposed between the outer housing and the inner filter and defining at least a majority of the annular open cavity, and further defining with the outer housing an axially extending substantially annular volume. The treating element may comprise a liquid permeable treating media disposed in the substantially annular volume and through which liquid must flow axially from the outer housing openings, past the inner substantially liquid impermeable housing, and then into the substantially annular open cavity. The inner housing outer wall, and the outer housing inner wall, which define the axial extending annular volume, preferably have an irregular contour, so as to minimize the chance of liquid channeling as it axially flows through the annular volume. For example the walls may be castellated or wavy. The treating element disposed in the annular volume preferably comprises a liquid porous media which is capable of removing of at least about 50% of at least one of lead, arsenic, bacteria, or viruses. For example the filter assembly may further comprise a retaining screen for the treatment media disposed between a lower end of the inner housing and the bottom end of the outer housing, and at the plurality of openings in the outer housing; and wherein the treatment media comprises granular or pelletized treatment media. For example the treatment media may be an ion exchange resin.

Preferably the filter assembly also further comprises a tubular mounting element extending from the upper surface of the cap down into the bottle in use and having inner and outer surfaces; and wherein the outer housing is releasably attached to the outer surface of the tubular mounting element in a substantially liquid tight manner; and wherein the inner filter element is releasably mounted by the inner surface of the tubular mounting element in a substantially liquid tight manner. In a preferred embodiment, the inner filter element comprises a carbon and plastic matrix having a porosity (pore size) of between nominally 10–150 microns and capable of removing at least about 50% (e.g. more than 70%, such as 90%+) of the chlorine and at least 50% (e.g. 90%+) of the lead in drinking water flowing therethrough, over a life of at least several (e.g. thirty) gallons.

According to another embodiment of the invention, the treating element comprises a substantially continuous at least primarily radial flow substantially annular outer filter element mounted within the outer housing to define the substantially annular open cavity as a first cavity adjacent an inner surface thereof, and to define a second substantially annular open cavity at an outer surface thereof, between the outer surface of the outer filter element and the outer housing, the plurality of openings in the outer housing communicating with the second substantially annular open cavity. Preferably the outer filter element comprises a micro-porous filter element connected to the outer housing in a substantially liquid tight manner at upper and lower ends thereof, so that water must flow through the micro-porous filter element from the second substantially annular open cavity to the first substantially annular open cavity. The micro-porous filter element may have a pleated or accordion configuration to maximize surface area, and may have a porosity of 3–6 microns.

According to another embodiment of the invention, the treating element comprises a water chilling element, and the outer housing is a thermal insulator over more than 80% of the extent thereof. Preferably the water chilling element is liquid impervious, and also defines a bottom cavity at the bottom end of the inner filter element.

According to another aspect of the present invention a filter assembly is provided for lowering the temperature of water in a bottle having a substantially circular cross-section neck, either the temperature of all of the water in the bottle at the same time, or defining a chilled volume so that the water is chilled substantially only before being filtered and passing out of the bottle. According to this aspect of the invention the filter assembly comprises the following components: A cap for closing the bottle neck or open end, including an upper surface. A manual valve, manually movable between open and closed positions, associated with the upper surface. An inner at least primarily radial flow filter element having top and bottom ends, the top end operatively connected to the cap and positioned so that liquid from the bottle must flow therethrough before passing through the manual valve. A water chilling element having a first end operatively connected to the cap, and radially surrounding the inner filter element, and surrounding the inner filter element at the bottom end thereof. And, the water chilling element defining a substantially annular open cavity substantially radially surrounding the inner filter element and interior of the water chilling element.

In this aspect of the invention, preferably the water chilling element is substantially liquid impermeable; and further comprises a plurality of substantially radially extending openings extending through the water chilling element to allow liquid to flow into the substantially annular open cavity. Desirably, the plurality of substantially radially extending openings are provided adjacent the first end of the water chilling element at substantially the closest portion thereof to the cap upper surface. Optionally, an insulating sleeve, substantially completely surrounding the water chilling element on the opposite side of the plurality of openings from the cap, is provided.

It is the primary object of the present invention to provide an effective, yet simple and compact, filter assembly capable of use with a bottle, and highly portable, and capable of treating drinking water in at least two different ways. This and other objects of the invention will become clear from an inspection of the detailed description of the invention, and from the appended claims.

DETAILED DESCRIPTION OF THE DRAWINGS

Figure 1:
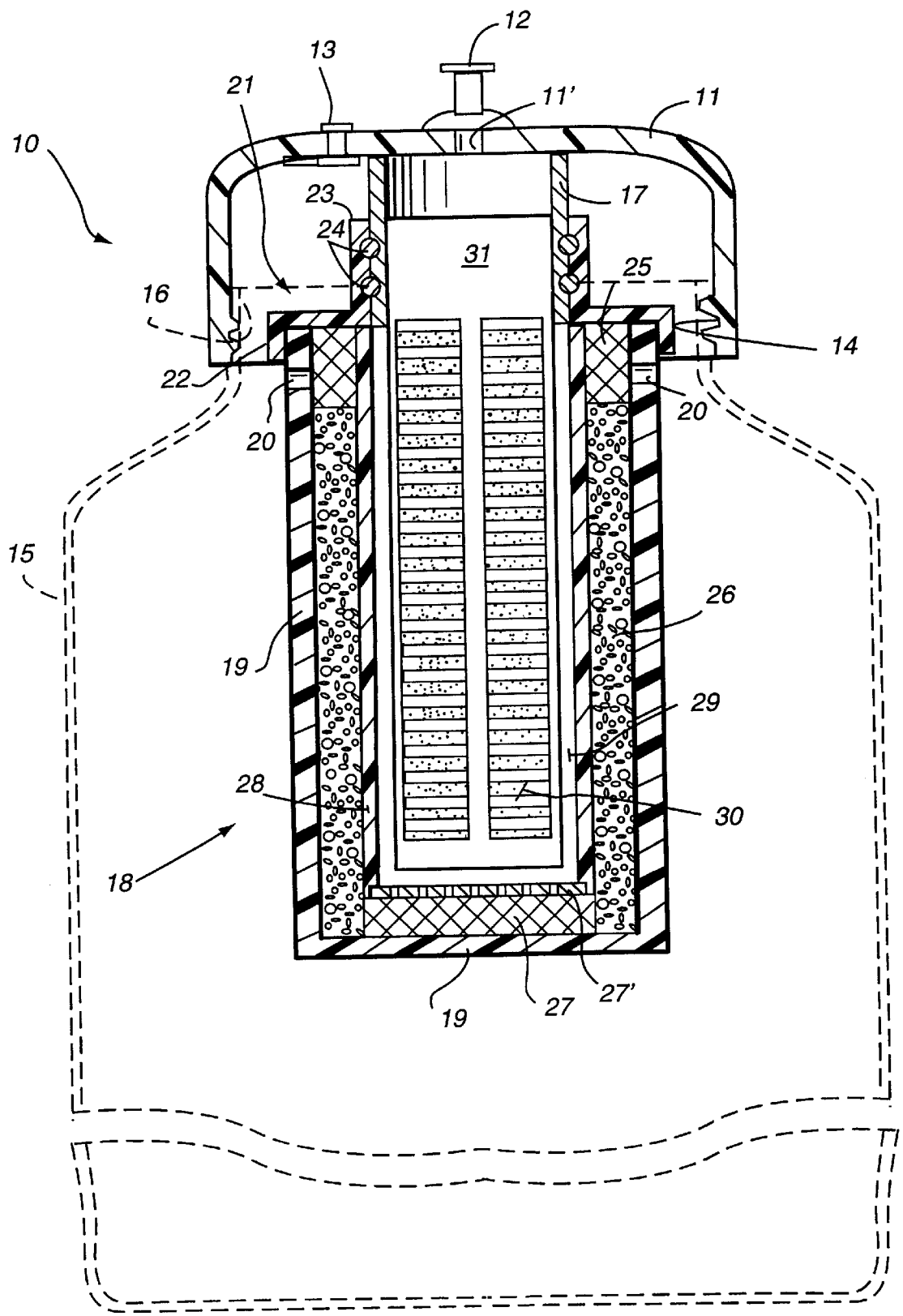
FIG. 1 is a side view, partly in elevation, but primarily in cross-section, showing an exemplary filter assembly according to the present invention, with the plastic bottle with which it is used illustrated in dotted line.

One embodiment of the filter assembly according to the present invention is shown generally by reference numeral 10 in FIG. 1. It includes a cap 11, having a water passage opening 11' therein, with a manual valve 12 (as described in the above referenced patent and co-pending applications which have been incorporated by reference herein) that is movable between open and closed positions associated with the upper surface of the cap 11 as seen in FIG. 1. For example the valve 12 may be a conventional push-pull valve. While the filter assembly 10 is typically self-venting, if it is not, or where additional venting is desired, the optional air intake valve 13 may be provided in the cap 11. The cap 11 is preferably constructed with internal screw threading 14, or any other suitable conventional mechanism, for attachment to a conventional bottle 15 having a substantially circular cross-section neck or open end which the cap 11 closes. For example external screw threads 16 may be provided on the bottle 15 for cooperating with the internal threads 14 of the cap 11 to secure the cap 11 to the bottle 15. The bottle 15 may be of any suitable type but preferably is a plastic bottle, and one drinks out of the bottle 15 by inverting it and/or squeezing it.

Extending downwardly from the upper surface of the cap 11 preferably is a mounting tubular element 17 having inner and outer surfaces and which preferably is integral with the cap 11, e.g. made of the same injection molded plastic. Mounted to the mounting element 17 is the water treating structure shown generally at 18. Structure 18 includes an outer housing 19 which is substantially liquid impervious and has a plurality of substantially radially extending openings 20 therein. The housing 19 is operatively connected to the cap 11, for example by mounting structure 21 which includes a lower portion 22 which is preferably rigidly secured to, or integral with, the housing 19, and an upper tubular portion 23 which mates with the outer surface of the tubular mounting structure 17. The mounting base or component between the structures 17, 23 is preferably liquid tight, which may be provided by one, two, or more O-rings 24, elastic rings of other profiles, or a resilient mounting. Thus the housing 19 is operatively connected at the upper end thereof to the cap 11. While the mounting structure described above is preferred, especially since the housing may be readily detached by pulling the tube 23 off of the tube 17, a wide variety of other mounting structures may alternatively be provided, including a permanent attachment, such as by ultrasonic welding or adhesive.

The FIG. 1 embodiment also includes a screen 25, which is liquid porous, for retaining a granular or pelletized treatment element 26 in structure 18, with another screen 27, and perhaps a perforated plate 27', being disposed at the bottom of the housing 19 for also retaining the treatment element 26.

The treating element 26 may be any suitable type of treating element for removing contaminants from the water flowing axially therethrough, such as a material capable of removing at least about 50% (e.g. about 70% or more) of one or more of lead, arsenic, bacteria, or viruses. For example the material 26 may be an ion exchange resin. Material 26 is liquid pervious even if not in granular or pelletized form, and the water flows axially therethrough from opening 20 through perforated plate 27'.

The element 18 in the FIG. 1 embodiment also includes an inner tubular housing 28 which preferably is rigidly attached at one end thereof to the mounting cap 21, and at the bottom end thereof engages the screen 27 and/or perforated plate 27'. The inner housing 28 defines therewithin a substantially annular open cavity 29 substantially radially surrounding an inner filter element 30 having an upper portion 31 that is in substantially liquid tight sealing relationship with the inner surface of the tubular mount 17. The inner filter element 31 is an at least primarily radial flow element. Its bottom extends to a termination in an annulus adjacent the perforated plate 27', and preferably the cavity 29 continues to the bottom too as illustrated in FIG. 1. The inner filter element 31 preferably is a conventional carbon/plastic porous matrix (e.g. about 60% carbon and about 40% plastic) having a porosity (pore size) of between nominally 10–150 microns which is capable of removing at least about 50% (e.g. 70%+ or even 90%+) of chlorine from drinking water, and such as disclosed in U.S. Pat. No. 5,609,759. Water from the cavity 29 flows primarily radially through the filter element 30, and then ultimately passes through the opening 11' in the cap 11 when the valve 12 is open and the bottle 15 is inverted and/or squeezed.

Figure 2:
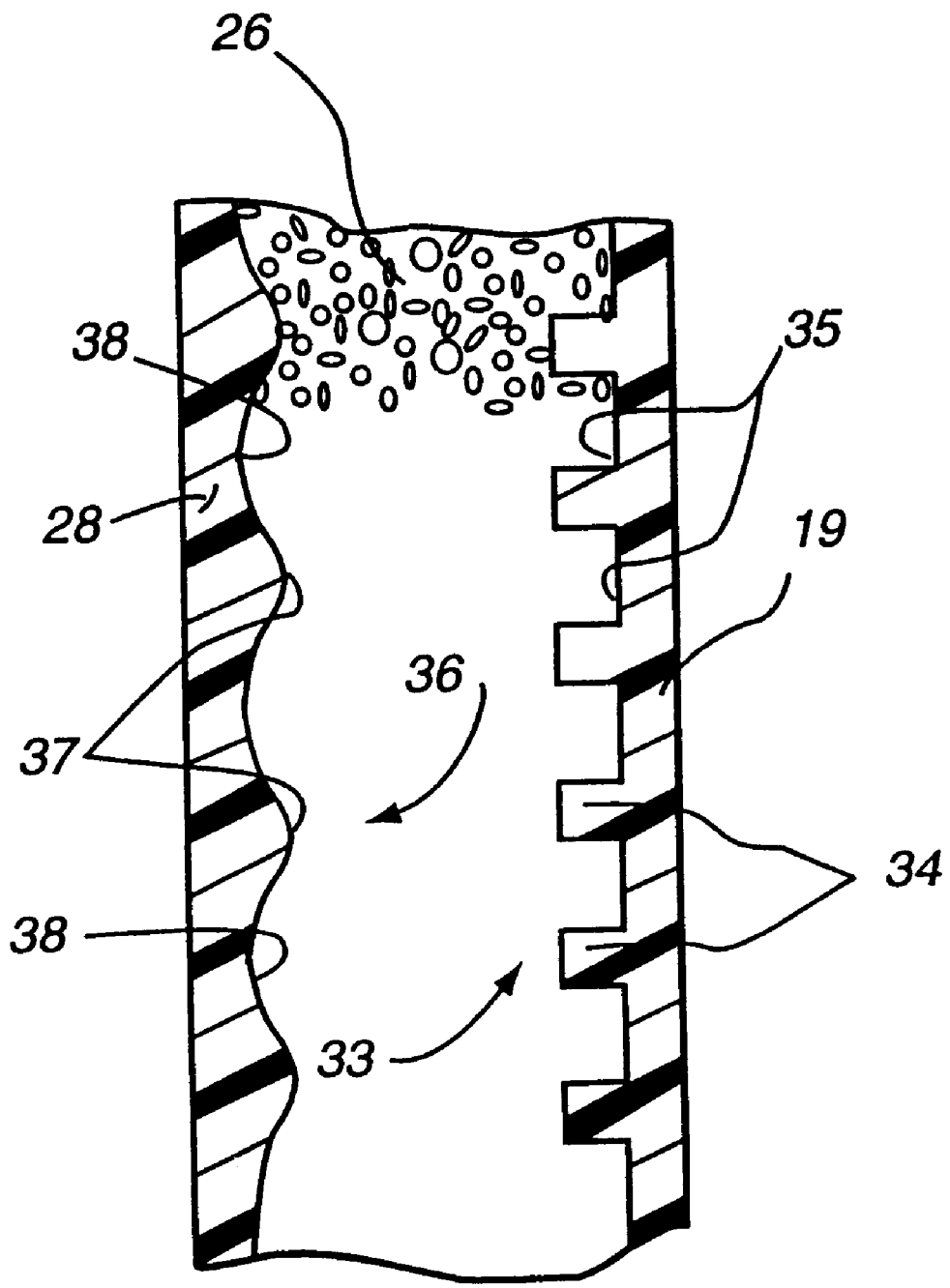
FIG. 2 is a detailed enlarged view of the construction that the inner and outer housings in the axial flow volume of the assembly of FIG. 1 may have.

In order to minimize channeling of water flowing in the annular volume between the housings 19, 28, which can occur when a granular or pelletized material 26 is used, the inner surface 33 of the outer housing 19, and the outer surface 36 of the inner housing 28—as seen in FIG. 2—may be provided with an uneven contour. For example the surface 33 is shown as castellated, having projections 34 and valleys or depressions 35, while the surface 36 is shown as wavy, having peaks 37, and valleys 38. Any other suitable surface contour may be provided, preferably as long as the magnitude of the contours is greater than the average size of the pellets or granules of the treating material 26.

Figure 3:
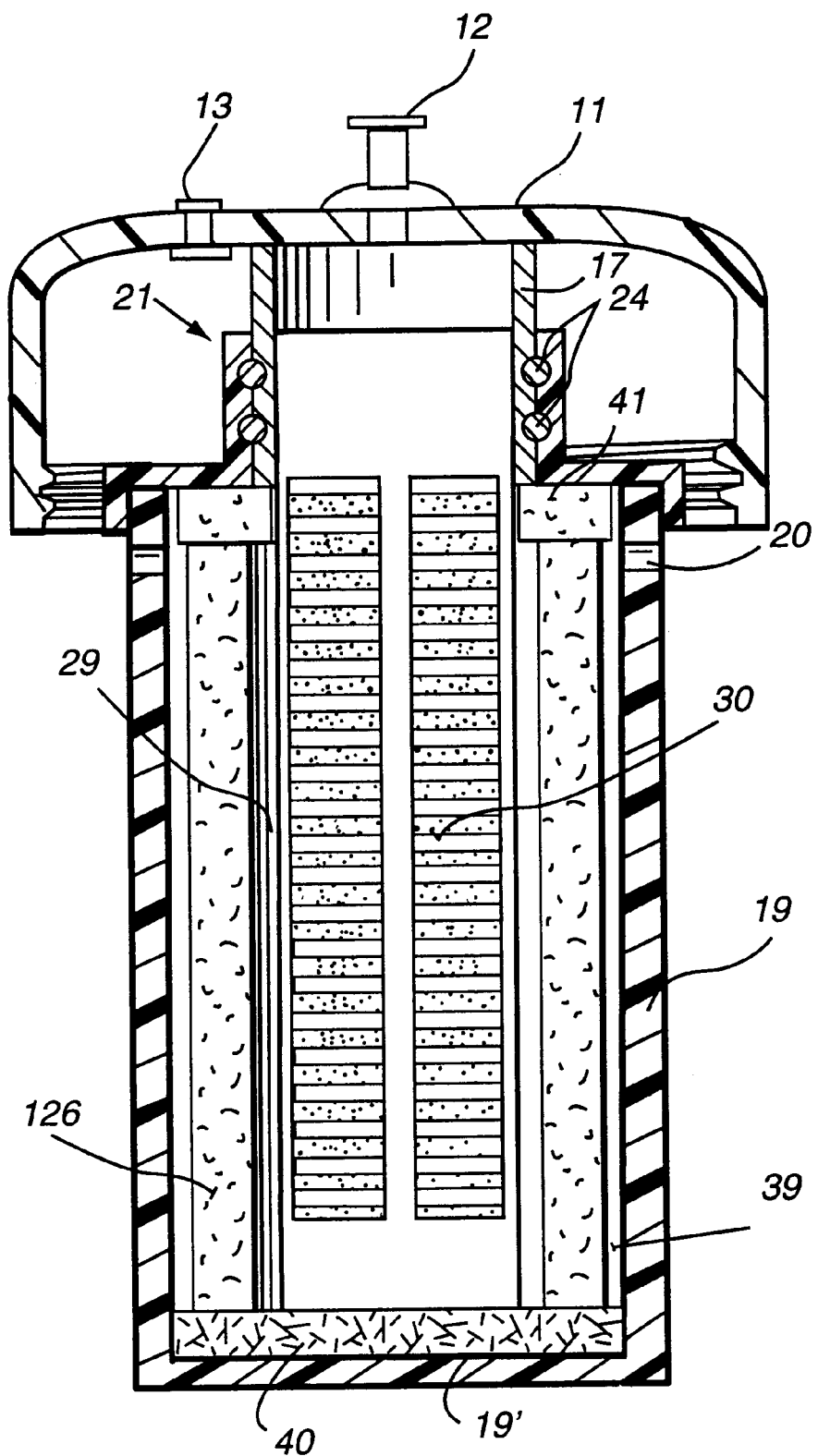
FIG. 3 is a view like that of FIG. 1 of a second embodiment according to the invention.

FIG. 3 shows another embodiment according to the present invention in which components that are same as those in the FIG. 1 embodiment are shown by the same reference numeral, and in which components similar but not the same as in the FIG. 1 embodiment are shown by the same reference numeral only preceded by a "1".

The major difference between the FIG. 3 and FIG. 1 embodiments is that in the FIG. 3 embodiment the treating element 126 is a micro-porous filter element preferably in a pleated or accordion configuration and which is mounted within the outer housing 19 so as to define an open annular volume 39 into which water flows through the openings 20 in the outer housing 19. The water then flows radially through the micro-porous element 126, which preferably has a pore size of between 3–6 microns (or alternatively about 0.4–0.5 microns), and which is capable of removing substantially all of the protozoa in the water. The micro-porous element 126 is preferably mounted at the bottom thereof by a potting compound 40 which attaches the micro-porous element 126 to the bottom 19' of the outer housing 19 in a liquid tight manner. Similar potting compound 41 may be provided at the top of the micro-porous element 126 to connect it to the top mounting structure 21 associated with the housing 19.

Figure 4:
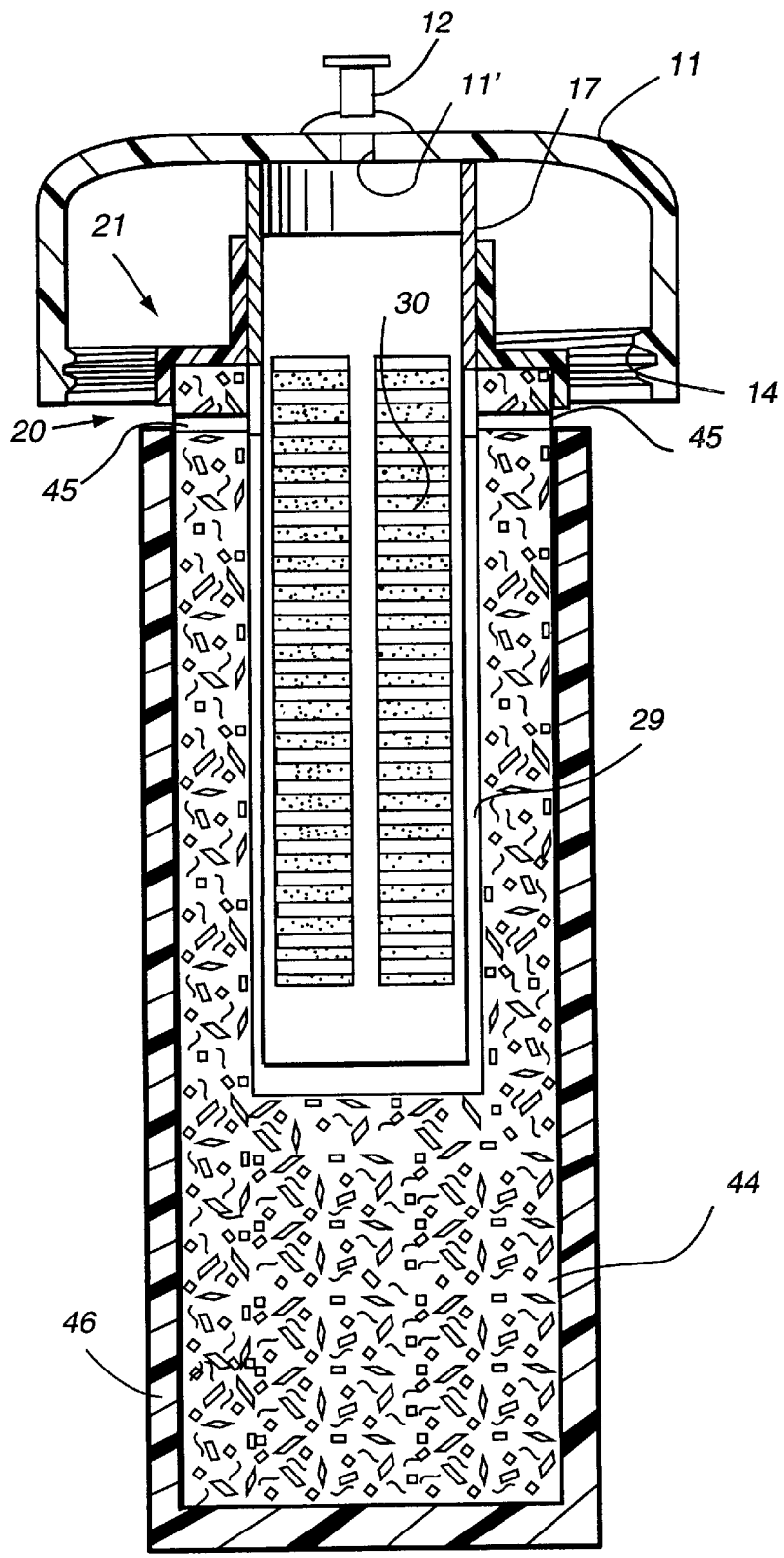
FIG. 4 is a view like that of FIG. 1 of yet another embodiment according to the invention.

FIG. 4 illustrates another embodiment according to the present invention. In this embodiment those structures that are the same as those in FIGS. 1 and 3 embodiment being shown by the same reference numeral.

The major difference in the FIG. 4 embodiment and the others is that the treating element comprises a water chilling element 44. Preferably the water chilling element 44 is liquid impervious and is the conventional type that is put in a freezer and frozen, and then absorbs heat until it reaches the temperature of its surroundings. One example of such a material is sold under the trademark "BLUE ICE", and other examples of reusable/refreezable ice packs/cold gel products for such application include those of Rubbermaid Specialty Products Division, Wooster, Ohio, Jack Frost Laboratories, Inc., Ft. Pierce, Fla., Mastex Industries, Inc., Petersburg, Va., etc. Cold retaining materials of this nature can also be made from a mixture of water, food coloring, refrigerants such as ethylene glycol or salt, and starch, or other thickening agent. Because the element 44 is typically liquid impervious, substantially radially extending openings 45 are provided therein which are, when the outer housing element 46 is provided, aligned with the openings 20, and extend into the substantially annular open cavity 29 surrounding the inner filter element 30. The element 44 is typically permanently secured to the mounting cap portion 21 which in this embodiment need not have a completely liquid tight seal with the mounting tube 17, and therefore no 0-rings or other elastic elements are illustrated in FIG. 4; however a liquid tight seal may be provided.

The optional outer housing 46 in the FIG. 4 embodiment is—instead of simply standard rigid plastic as shown for housings 19 in the FIGS. 1 and 3 embodiment—a heat insulating material, such as a low density plastic like styrofoam. It is provided as a sleeve and substantially prevents the element 44 from absorbing heat from all of the liquid in the bottle (15) in which it is immersed. Rather when the insulating outer housing 46 is used, the water that is chilled is only the water that flows through the openings 45, and when it is in the cavity 29. When used, the thermally insulating outer housing 46 preferably covers at least 80% of the outer surface of element 44 (e.g. more than 90% as illustrated in FIG. 4).

Once the element 44 no longer has water chilling capacity, it is detached from the cap 11 by moving the mounting portion 21 thereof off of the tubular mount 17, and optionally—if the insulated housing 46 is provided—insulating housing 46 may be detached too. In any event the element 44 is then placed in a freezer until it again has a desired cooling capacity for use with the cap 11, and then it is moved back into operative association with the tubular mount 17.

It will thus be seen that according to the present invention a simple yet effective filter assembly is provided for treating water both with an inner filter element (such as a carbon/plastic matrix self-venting porous filter element for removing at least 50%, and even more than 90%, of the chlorine taste and odor from drinking water passing therethrough) as well as treating the drinking water in another manner, such as by removing lead, arsenic, bacteria, viruses, protozoa, or other contaminants, or by reducing the temperature thereof so that it is more desirable to drink. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and assemblies.

What is claimed is:

1. A filter assembly for use with a bottle having a substantially circular cross-section neck or open end, comprising:

a cap for closing the bottle neck or open end, including an upper surface;

a manual valve, manually movable between open and closed positions, associated with said upper surface;

an outer, substantially liquid impermeable, housing having upper and lower end portions, said upper end portion operatively connected to said cap;

a plurality of openings in said outer housing disposed adjacent said upper end portion to allow liquid to flow therethrough;

an inner at least primarily radial flow filter element having top and bottom ends, said top end operatively connected to said cap and positioned so that liquid from the bottle must flow therethrough before passing through said manual valve;

a substantially annular open cavity substantially radially surrounding said inner filter element, and interior of said outer housing;

a treating element which treats liquid passing through said outer housing openings and into said open cavity, said treating element operatively between said outer housing and said open cavity, said treating element comprising a water chilling element, and wherein said outer housing is a thermal insulator over more than 80% of the extent thereof.

2. A filter assembly as recited in claim 1 wherein said cap includes a tubular mounting element extending from said upper surface of said cap into the bottle in use and having inner and outer surfaces; and wherein said outer housing is releasably attached to said outer surface of said tubular mounting element in a substantially liquid tight manner; and wherein said inner filter element is releasably mounted by said inner surface of said tubular mounting element in a substantially liquid tight manner.

3. A filter assembly as recited in claim 1 wherein said inner filter element comprises a porous activated carbon, plastic matrix capable of removing at least 50% of the chlorine in drinking water passing therethrough, and having a porosity of between nominally 10–150 microns.

4. A filter assembly as recited in claim 1 wherein said water chilling element is substantially liquid impermeable and defines said substantially annular open cavity, said substantially annular open cavity including a cavity portion at said bottom end of said inner filter element, and said plurality of openings in said outer housing continuing through said water chilling element.

5. A filter assembly as recited in claim 4 wherein said inner filter element comprises a porous activated carbon, plastic matrix capable of removing at least 50% of the chlorine in drinking water passing therethrough, and having a porosity of between about 10–150 microns.

6. A filter assembly as recited in claim 5 wherein said cap includes a tubular mounting element extending from said upper surface of said cap down into the bottle in use and having inner and outer surfaces; and wherein said outer housing is releasably attached to said outer surface of said tubular mounting element; and wherein said inner filter element is releasably mounted by said inner surface of said tubular mounting element in a substantially liquid tight manner.

7. A filter assembly for use with a bottle having a substantially circular cross-section neck or open end, comprising:

a cap for closing the bottle neck or open end, including an upper surface;

a manual valve, manually movable between open and closed positions, associated with said upper surface;

an inner at least primarily radial flow filter element having top and bottom ends, said top end operatively connected to said cap and positioned so that liquid from the bottle must flow therethrough before passing through said manual valve;

a water chilling element having a first end operatively connected to said cap, and radially surrounding said inner filter element, and surrounding said inner filter element at said bottom end thereof; and said water chilling element defining a substantially annular open cavity substantially radially surrounding said inner filter element and interior of said water chilling element.

8. A filter assembly as recited in claim 7 wherein said water chilling element is substantially liquid impermeable; and further comprising a plurality of substantially radially extending openings extending through said water chilling element to allow liquid to flow into said substantially annular open cavity.

9. A filter assembly as recited in claim 8 wherein said plurality of substantially radially extending openings are provided adjacent said first end of said water chilling element at substantially the closest portion thereof to said cap upper surface.

10. A filter assembly as recited in claim 9 further comprising an insulating sleeve substantially completely surrounding said water chilling element on the opposite side of said plurality of openings from said cap.

11. A filter assembly as recited in claim 7 wherein said inner filter element comprises a porous activated carbon, plastic matrix capable of removing at least 50% of the chlorine in drinking water passing therethrough, and having a porosity of between about 10–150 microns.

12. A filter assembly as recited in claim 11 wherein said cap includes a tubular mounting element extending from said upper surface of said cap into the bottle in use and having inner and outer surfaces; and wherein said outer housing is releasably attached to said outer surface of said tubular mounting element in a substantially liquid tight manner; and wherein said inner filter element is releasably mounted by said inner surface of said tubular mounting element in a substantially liquid tight manner.

13. A filter assembly for use with a bottle having a substantially circular cross-section neck or open end, comprising:

a cap for closing the bottle neck or open end, including an upper surface;

a manual valve, manually movable between open and closed positions, associated with said upper surface;

an outer, substantially liquid impermeable, housing having upper and lower end portions, said upper end portion operatively connected to said cap;

a plurality of openings in said outer housing disposed adjacent said upper end portion to allow liquid to flow therethrough;

an inner at least primarily radial flow filter element having top and bottom ends, said top end operatively connected to said cap and positioned so that liquid from the bottle must flow therethrough before passing through said manual valve;

a substantially annular open cavity substantially radially surrounding said inner filter element, and interior of said outer housing;

a treating element which treats liquid passing through said outer housing openings and into said open cavity, said treating element operatively between said outer housing and said open cavity;

an inner substantially liquid impermeable housing disposed between said outer housing and said inner filter and defining at least about a majority of said annular open cavity, and further defining with said outer housing an axially extending substantially annular volume;

wherein said treating element comprises liquid permeable treating media disposed in said substantially annular volume and through which liquid must flow axially from said outer housing openings, past said inner substantially liquid impermeable housing, and then into said substantially annular open cavity;

wherein said substantially annular volume is defined between an inner wall of said outer housing and an outer wall of said inner housing; and wherein said inner wall of said outer housing and said outer wall of said inner housing have a variable contour in order to minimize the possibility of channeling with liquid flowing axially through said substantially annular volume.

14. A filter assembly as recited in claim 13 wherein said treating media comprises media capable of removing at least about 50% of at least one of the following contained in water passing through said treatment media: lead, bacteria, and viruses.

15. A filter assembly as recited in claim 13 wherein said variable contours of said walls are at least one of castellated and wavy.

* * * * *